United States Patent
Weber et al.

(10) Patent No.: US 12,085,049 B2
(45) Date of Patent: Sep. 10, 2024

(54) INJECTION NOZZLE FOR A DUAL-FUEL ENGINE, DUAL-FUEL ENGINE AND METHOD FOR OPERATING THE SAME

(71) Applicant: MAN Energy Solutions SE, Augsburg (DE)

(72) Inventors: Armin Weber, Kammlach (DE); Maximilian Indrich, Bobingen (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

(21) Appl. No.: 18/369,979

(22) Filed: Sep. 19, 2023

(65) Prior Publication Data
US 2024/0102435 A1 Mar. 28, 2024

(30) Foreign Application Priority Data
Sep. 28, 2022 (DE) ...................... 10 2022 124 897.6

(51) Int. Cl.
*F02M 43/04* (2006.01)
(52) U.S. Cl.
CPC .................................. *F02M 43/04* (2013.01)
(58) Field of Classification Search
CPC ........................................................ F02M 43/04
See application file for complete search history.

(56) References Cited

U.S. PATENT DOCUMENTS

| | | | | |
|---|---|---|---|---|
| 2005/0257769 A1* | 11/2005 | Li | ........................ | F02D 19/061 123/305 |
| 2006/0236974 A1* | 10/2006 | Randall | ............... | F02D 19/0605 123/304 |
| 2009/0020631 A1* | 1/2009 | Mashida | ............. | F02D 19/0694 239/533.3 |
| 2012/0255523 A1* | 10/2012 | Kim | ................... | F02M 51/0617 123/478 |
| 2015/0115055 A1* | 4/2015 | Wager | .................... | F02M 43/04 239/584 |
| 2019/0078542 A1* | 3/2019 | Wessner | ............. | F02M 63/0078 |

FOREIGN PATENT DOCUMENTS

DE 102017122117 3/2019

* cited by examiner

*Primary Examiner* — Long T Tran
(74) *Attorney, Agent, or Firm* — Cozen O'Connor

(57) ABSTRACT

An injection nozzle that for a first fuel in a first mode and in a second mode ignition fluid for a second fuel is introduced. The injection nozzle includes an injection nozzle body with first and second injection orifices and a displaceable injection nozzle needle in the injection nozzle body. The first injection orifices have smaller injection orifice cross-sections than the second injection orifices and are arranged at a defined distance. In a first displacement direction for closing the orifices the first injection orifices are located in front of the second injection orifices and seen in a second displacement direction of the injection nozzle needle for the opening or unblocking of the orifices, the first injection orifices are located behind the second injection orifices.

13 Claims, 3 Drawing Sheets

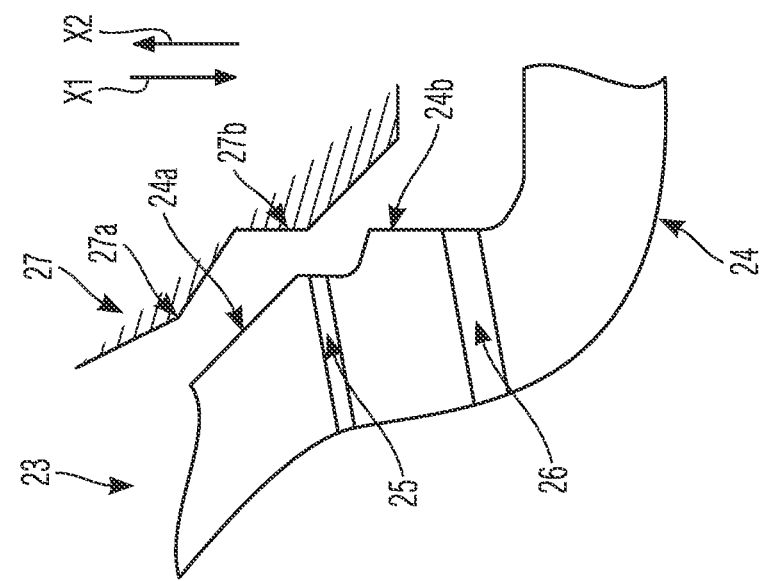
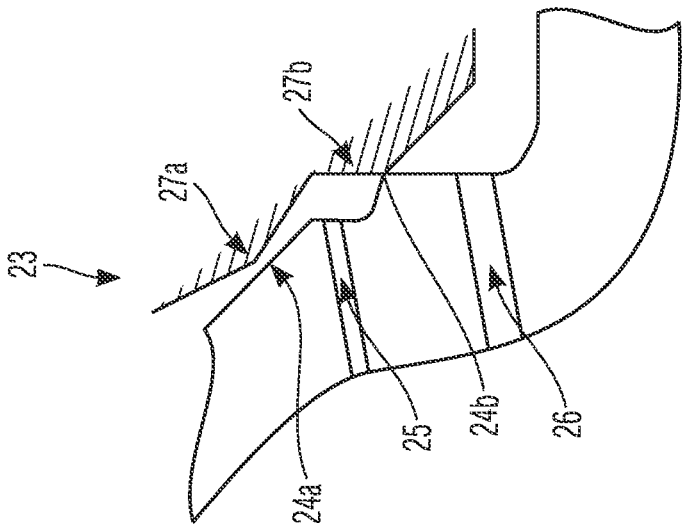
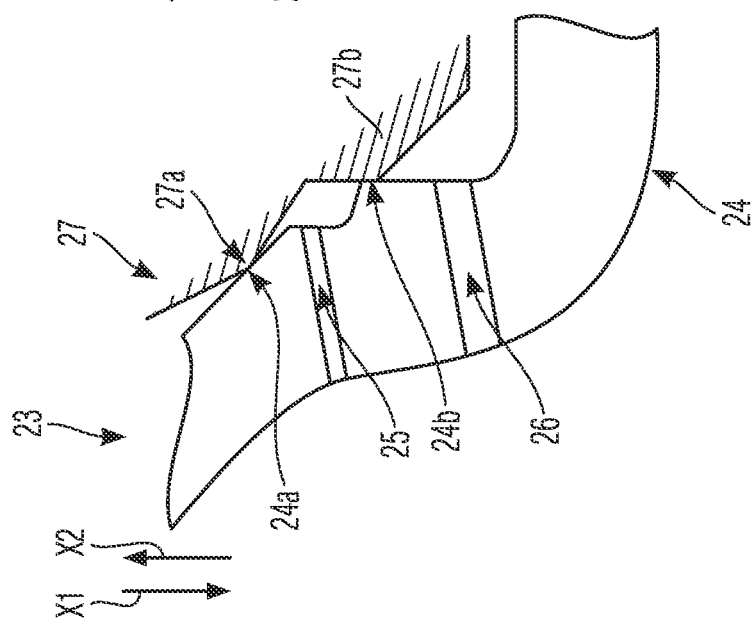

INJECTION NOZZLE FOR A DUAL-FUEL ENGINE, DUAL-FUEL ENGINE AND METHOD FOR OPERATING THE SAME

BACKGROUND OF THE INVENTION

1. Field of the Invention

The disclosure relates to an injection nozzle for a dual-fuel engine. Further, the disclosure relates to a dual-fuel engine and to a method for operating the same.

2. Description of Related Art

From practice, dual-fuel engines are known in which on the one hand in a first operating mode of the dual-fuel engine a first fuel, in particular a liquid ignitable fuel such as diesel, and on the other hand in a second operating mode of the dual-fuel engine, a second fuel, in particular a gaseous, low-ignitable fuel such as natural gas, can be combusted. In the second operating mode of the dual-fuel engine, a lean gas-air mixture is generally introduced into the cylinders of the dual-fuel engine and ignited by the ignition energy of an ignition fluid likewise introduced into the cylinders.

In FIG. 1, assemblies of a dual-fuel engine 1, known from the prior art are shown. FIG. 1 shows a cylinder 2 of such a dual-fuel engine 1. The cylinder 2 has a cylinder head 3. In the cylinder 2, a piston 4, which is guided by a connecting rod 5, moves up and down. In the cylinder head 3, an injection nozzle 6 is mounted, through which in the first operating mode of the dual-fuel engine the first fuel, in particular liquid diesel fuel, can be injected via a fuel line 7 from a fuel pump 8 into a combustion chamber 9 of the cylinder 2. The injection nozzle 6, the fuel line 7, and the fuel pump 8 are elements of a fuel supply device, which serves for supplying the first fuel into the combustion chamber 9 of the cylinder 2. This fuel supply device is active in particular when in the cylinder 2 of the dual-fuel engine in the first operating mode of the dual-fuel engine a liquid fuel, in particular diesel, is combusted as first fuel.

For combusting the liquid fuel, charge air 10 is introduced into the respective cylinder 2 of the dual-fuel engine 1 via an inlet valve 17, wherein exhaust gas 15 developing during the combustion of the fuel can be discharged via an exhaust valve 18 from the respective cylinder 2 of the dual-fuel engine 1.

In the combustion chamber 9 of the cylinder 2 of the dual-fuel engine 1, a second fuel, in particular gas, can be combusted in a second operating mode of the dual-fuel engine. For this purpose, the dual-fuel engine 1 includes a mixture-forming unit 20, in which a mixture of combustion air 10 and gas, which is provided to the mixture-forming unit 20 via a gas supply line 21, is formed, wherein the gas-air mixture is introduced into the combustion chamber 9 of the cylinder 2 via the inlet valve 17. Exhaust gas 15 also develops during the combustion of the gas which can be discharged from the cylinder 2 via the exhaust valve 18. Ignition fluid serves for igniting the second fuel, in particular the gas-air mixture in a further combustion chamber 11 of the cylinder 2, which ignition fluid with the help of an ignition fluid injector 13 can be introduced into a further combustion chamber 11 of the cylinder 2, wherein this further combustion chamber 11 of the cylinder 2 is coupled to the combustion chamber 9 via at least one connecting channel 12. Alternatively, the ignition fluid can also be directly introduced into the combustion chamber 9. The ignition fluid injector 13 of the cylinder 2 shown in FIG. 1 is part of an ignition fluid injection system of the dual-fuel engine 1, wherein the ignition fluid injection system for each cylinder 2 of the dual-fuel engine 1 includes an individual ignition fluid injector 13. The ignition fluid injectors 13 can be supplied with ignition fluid via an ignition fluid line 14 starting from a common ignition fluid reservoir 22 of the ignition fluid injection system, wherein the ignition fluid reservoir 22 is assigned an ignition fluid delivery pump 16, which supplies the ignition fluid reservoir 22 with ignition fluid. The ignition fluid delivery pump 16 can be an electrically operated high pressure pump. The ignition fluid delivery pump 16 is assigned a suction choke 19.

A dual-fuel engine 1 known from practice accordingly comprises on the one hand the fuel supply device for supplying the first fuel in the first operating mode of the dual-fuel engine 1, while on the other hand the dual-fuel engine 1 known from practice has a separate ignition fluid injection system in order to introduce the ignition fluid into the cylinders 2 of the dual-fuel engine 1 in the second operating mode of the dual-fuel engine 1 for combusting the second fuel.

A dual-fuel engine known from practice accordingly has two injection systems, namely the fuel supply device for the first fuel and the ignition fluid injection system for the ignition fluid. The ignition fluid is typically the first fuel of the first operating mode which in the second operating mode of the dual-fuel engine can be introduced in a relatively low quantity into the respective cylinder via the respective ignition fluid injector of the ignition fluid injection system. In dual-fuel engines know from practice, the injection nozzles of the fuel supply device for the first fuel are not suitable for delivering such low quantities of the first fuel in the second operating mode of the dual-fuel engine. This then requires two injection systems and requires a complex construction of dual-fuel engines.

From DE 10 2017 122 117 A1 an injection nozzle for a cylinder of a dual-fuel engine is known with which on the one hand in the first operating mode the first fuel, and on the other hand in the second operating mode the ignition fluid can be introduced into the combustion chamber of the respective cylinder of the dual-fuel engine. Then, two injection systems are no longer required. In an injection nozzle body of the injection nozzle, first injection orifices and second injection orifices are introduced, wherein the first injection orifices have a smaller injection orifice cross-section than the second injection orifices. An injection nozzle needle interacts with the injection nozzle body wherein in the axial direction and thus seen in the displacement direction of the injection nozzle needle the first injection orifices and the second injection orifices have a defined distance from one another.

According to DE 10 2017 122 117 A1, the second injection orifices, seen in a displacement direction of the injection nozzle needle serving for the closing or blocking of the injection orifices, are arranged in front of the first injection orifices. Seen in an opposite displacement direction of the injection needle serving for the opening or unblocking of the injection orifices, the second injection orifices are positioned behind the first injection orifices. Into the injection nozzle needle a guide channel is introduced through which the first fuel or the ignition fluid flows both in the first operating mode and also in the second operating mode of the dual-fuel engine.

Although the injection nozzle of DE 10 2017 122 117 A1 already makes possible saving an injection system on a dual-fuel engine, namely a separate injection system for the ignition fluid there is a need for an alternative injection nozzle for a dual-fuel engine which likewise makes it possible to omit a separate injection system for the ignition fluid but which is easier to manufacture.

SUMMARY OF THE INVENTION

One aspect of the present invention is a new type of injection nozzle for a dual-fuel engine, a dual-fuel engine having such an injection nozzle and a method for operating the dual-fuel engine.

According to one aspect of the invention, seen in a displacement direction of the injection nozzle needle serving for the closing or blocking of the injection orifices, the first injection orifices are located in front of the second injection orifices and, seen in a displacement direction of the injection nozzle needle serving for the opening or unblocking of the injection orifices, the first injection orifices behind the second injection orifices.

Because of the fact that with the injection nozzle according to an aspect of the invention the relative position of the first injection orifices of the injection nozzle and the second injection orifices of the injection nozzle are switched relative to the prior art, i.e. in that seen in the displacement direction of the injection nozzle needle serving for the closing or blocking of the injection orifices the first injection orifices with the smaller injection orifice cross-section are located in front of the second injection orifices with the larger injection orifice cross-section and seen in a displacement direction of the injection nozzle needle serving for the opening or unblocking of the injection orifices the first injection orifices with the smaller injection orifice cross-section are located behind the second injection orifices with the larger injection orifice cross-section, a simpler manufacture of the injection nozzle is possible. In particular, a guide channel for the first fuel or the ignition fluid, which extends through the injection nozzle needle, can be omitted.

Preferentially, the injection nozzle needle of the injection nozzle according to the invention comprises a first, preferentially frustoconical needle portion, which interacts with a first valve seat of the injection nozzle body, and a second preferentially cylindrical needle portion, which interacts with a second valve seat of the injection nozzle body, wherein in particular when the injection nozzle needle opens or unblocks both the first injection orifices and also the second injection orifices, the first needle portion is lifted off the first valve seat and the second needle portion off the second valve seat. This is preferred for a simple manufacture of the injection nozzle.

Preferentially, the injection nozzle needle of the injection nozzle according to an aspect of the invention unblocks or opens in the second operating mode of the dual-fuel engine, in which the injection nozzle serves for introducing the ignition fluid into the combustion chamber of the cylinder, the first and the second injection orifices for introducing the ignition fluid into the combustion chamber of the cylinder. Because of this it is possible to introduce ignition fluid via the second injection orifices into the combustion chamber of the respective cylinder also for igniting.

Preferentially, the first fuel flows in the first operating mode of the dual-fuel engine, in which the injection nozzle serves for introducing the first fuel into the combustion chamber of the cylinder, exclusively on the outside along the injection nozzle needle through a gap between the injection nozzle needle and the injection nozzle body, wherein in the second operating mode of the dual-fuel engine, in which the injection nozzle serves for introducing the ignition fluid into the combustion chamber of the cylinder, the ignition fluid likewise flows exclusively on the outside along the injection nozzle needle through a gap between the injection nozzle needle and the injection nozzle body. Both in the first operating mode and also in the second operating mode of the dual-fuel engine, the first fuel or the ignition fluid and the ignition fluid exclusively flow through a gap between the injection nozzle needle and the injection nozzle body. The guide channel extending through the nozzle needle that is required according to the prior art for the first fuel or the ignition fluid can be omitted.

Aspects of the invention are obtained from the following description.

BRIEF DESCRIPTION OF THE DRAWINGS

Exemplary embodiments of the invention are explained in more detail by way of the drawing without being restricted to this. There it shows:

FIG. 2: is a detail of an injection nozzle according to the invention in a first state;

FIG. 3: is the detail of FIG. 2 in a second state;

FIG. 4: is the detail of FIG. 2, 3 in a third state; and

DETAILED DESCRIPTION OF THE PRESENTLY PREFERRED EMBODIMENTS

Figure 1:
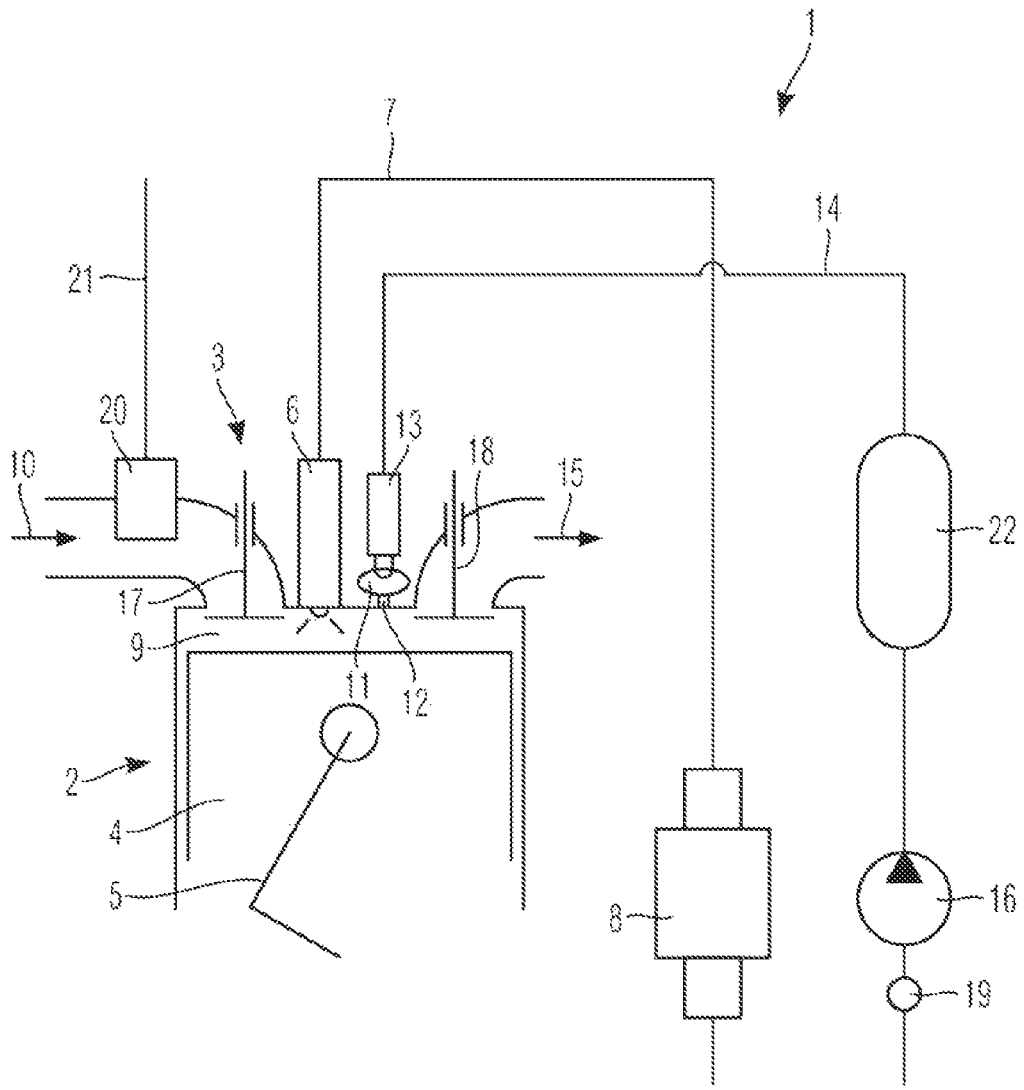
FIG. 1: is a block diagram of a duel fuel engine according to the prior art.

The disclosure relates to an injection nozzle for a dual-fuel engine and to a dual-fuel engine. The basic construction of a dual-fuel engine is familiar to the person skilled in the art addressed here and was already explained in detail making reference to FIG. 1. Accordingly, in a first operating mode of the dual-fuel engine, a first fuel, in particular a liquid ignitable fuel such as for example a diesel fuel, is introduced into the cylinders of the engine and combusted in the cylinders. In a second operating mode of the dual-fuel engine, a second fuel, in particular a mixture that is low-ignitable as such of a gaseous fuel and air, is introduced into the cylinders of the dual-fuel engine and ignited via an ignition fluid. In particular the liquid fuel of the first operating mode serves as ignition fluid in the second operating mode, but which in the second operating mode is introduced in a lesser quantity into the combustion chamber of the cylinders than in the first operating mode. Instead of the first fuel of the first operating mode, a different ignition fluid can also be utilised as ignition fluid for igniting the second fuel of the second operating mode. For example, a marine diesel oil such as a DMB, DMX or VLSFO fuel, an HVO (hydrogenated vegetable oils) fuel or an HFO (heavy fuel oil) fuel can be utilised. However, this listing is purely exemplarily in nature. Other ignition fluids can also be utilised.

In order to make this possible, dual-fuel engines known from practice have two separate injection systems, namely a fuel injection system via which in the first operating mode the first fuel is introduced in a relatively large quantity into the cylinders of the dual-fuel engine, and an ignition fluid injection system, via which in the second operating mode the ignition fluid is introduced in a relatively low quantity into the cylinders. The invention present here relates to an injection nozzle 23 for a cylinder 2 of a dual-fuel engine 1, via which in the first operating mode the liquid fuel and in the second operating mode the ignition fluid can be introduced into the combustion chamber 9 of the respective cylinder 2 so that accordingly no two separate injection systems are required.

FIGS. 2, 3 and 4 each show an extract from an injection nozzle 23 according to an aspect of the invention in different states of the same, wherein an injection nozzle body 24 and an injection nozzle needle 27 of the injection nozzle 23 are shown as extracts. The injection nozzle needle 27 is translationally displaceable in the injection nozzle body 24, namely for closing the injection nozzle 23 in the displacement direction X1 and for opening the injection nozzle 23 in the opposite displacement direction X2.

The injection nozzle body 24 of the injection nozzle 23 has first injection orifices 25 and second injection orifices 26, wherein in FIGS. 2, 3 and 4 merely one first injection orifice 25 and one second injection orifice 26 each is shown. In the circumferential direction of the injection nozzle body 24, multiple such injection orifices 25, 26 are arranged.

The first injection orifices 25 have a smaller injection orifice cross-section than the second injection orifices 26, wherein the first injection orifices 25 and the second injection orifices 26, seen in the displacement direction of the injection nozzle needle 27, have a defined distance from one another, i.e. are offset from one another in the respective displacement direction X1 and X2.

According to an aspect of the present invention, the first injection orifices 25, which compared with the second injection orifices 26 have a smaller injection orifice cross-section are arranged seen in a displacement direction X1 of the injection nozzle needle 27 serving for the closing or blocking of the injection orifices 25, 26 and thus of the injection nozzle 23 are arranged in front of the second injection orifices 26. Seen in the second displacement direction X2 of the injection nozzle needle 27 opposite to the opening or unblocking of the injection orifices 25, 26 and thus of the injection nozzle 23, the first injection orifices 25, which relative to the second injection orifices 26 have the smaller injection orifice cross-section, are arranged behind the second injection orifices 26.

The injection nozzle needle 27 comprises a first needle portion 27a and a second needle portion 27b. The first needle portion 27a interacts with a first valve seat 24a of the injection nozzle body 24. The second needle portion 27b interacts with a second valve seat 24b of the injection nozzle body 24.

In particular when the injection nozzle 23 is inactive, i.e. is utilised neither for injecting the first fuel in the first operating mode of the dual-fuel engine nor for injecting the ignition oil in the second operating mode of the dual-fuel engine, the nozzle needle 27 closes or blocks both the first injection orifices 26 as well as the second injection orifices 26. In this case, the first needle portion 27a lies against the first valve seat 24a and the second needle portion 27b against the second valve seat 24b. This is shown in FIG. 2.

In particular when according to FIG. 4 the injection nozzle needle 27 opens or unblocks both the first injection orifices 25 and also the second injection orifices 26, the first needle portion 27a is lifted off the first valve seat 24a and the second needle portion 27b off the second valve seat 24b. This state shown in FIG. 4 is at least utilised in particular when the dual-fuel engine 1 is utilised in the first operating mode. Then, a first fuel can be introduced via the first injection orifices 25 and via the second injection orifices 26 each into the combustion chamber of the respective cylinder 2.

Before the injection nozzle 23, starting from the state of FIG. 2, is displaced into the state of FIG. 4, the injection nozzle 23 assumes the state of FIG. 3, wherein in FIG. 3 merely the first injection orifices 25 are opened or unblocked, but not the second injection orifices 26. In the state of FIG. 3, the first needle portion 27a is lifted off the first valve seat 24a, but the second needle portion 27b lies against the second valve seat 24b.

While, thus, in FIG. 4, a first fuel or ignition fluid is introduced into the combustion chamber 9 of the respective cylinder 2 via the first injection orifices 25 and the second injection orifices 26 each, fuel or ignition fluid can be introduced into the combustion chamber 9 of the respective cylinder 2 in the state of FIG. 3 merely via the first injection orifices 25.

Both in the state of FIG. 2 and also in the state of FIG. 3, the first fuel or the ignition fluid exclusively flows along the injection nozzle needle 27 on the outside and namely through a gap formed between the injection nozzle body 24 and the injection nozzle needle 27. This gap is relatively small in FIG. 3 and communicates merely with the first injection orifices 25. In FIG. 4, this gap is relatively large and communicates both with the first injection orifices 25 and also with the second injection orifices 26.

The first needle portion 27a of the injection nozzle needle 27 is contoured frustoconically and the second needle portion 27 of the same, cylindrically.

Figure 5:
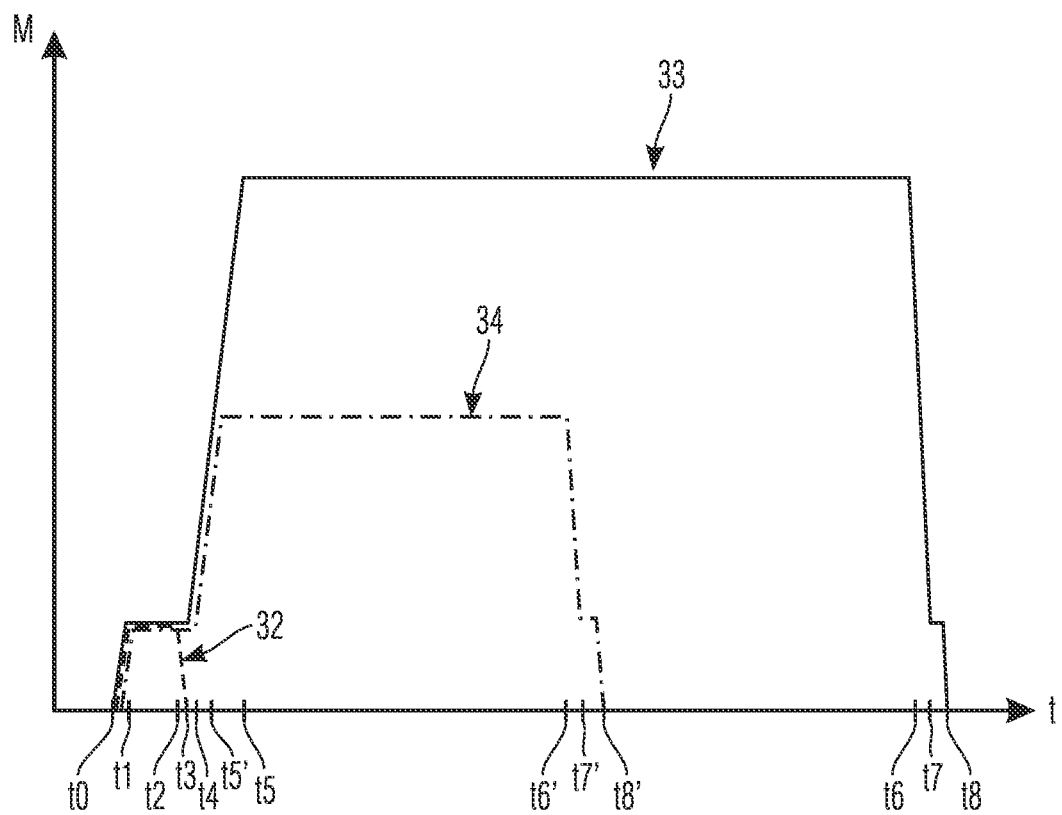
FIG. 5: is a diagram for illustrating the functioning of the injection nozzle according to the invention.

FIG. 5 illustrates with a diagram the injection quantity M that can be introduced during an injection operation or an injection cycle with the help of the injection nozzle 23 according to the invention into the combustion chamber 9 of the respective cylinder 2 with an injection timing profile.

Over the time t, three different curve profiles 32, 33 and 34 are plotted for the injection quantity M, namely with a curve profile 32 an injection quantity for the second operating mode of the dual-fuel engine, in which ignition oil is exclusively introduced via the first injection orifices 25 into the combustion chamber 9 of the respective cylinder 2, with the curve profile 33 the injection quantity for the first operating mode of the dual-fuel engine, in which first fuel is introduced into the combustion chamber 9 of the respective cylinder 2 both via the first injection orifices 25 and also via the second injection orifices 26, and with the curve profile 34 that injection quantity which in the second operating mode can be introduced into the combustion chamber 9 of the respective cylinder 2, namely in particular when in the second operating mode the ignition fluid is introduced into the combustion chamber 9 of the respective cylinder 2 both via the first injection orifices 25 and also via the second injection orifices 26.

At the time t0 of FIG. 5, the respective injection operation or injection cycle into the respective cylinder 2 of the dual-fuel engine 1 commences with the help of the injection nozzle 23, wherein before the time t0 the injection nozzle 23 assumes the state of FIG. 2. Between the time t0 and t1 of FIG. 5, the injection nozzle needle 27 of the injection nozzle 23 is moved, starting from the state of FIG. 2, in the direction of the state of FIG. 3 in order to introduce via the first injection orifices 25 ignition fluid or first fuel into the combustion chamber 9 of the respective cylinder 2. Between the times t1 and t2 of FIG. 5, the injection quantity M that can be introduced via the first injection nozzles 25 into the combustion chamber 9 of the respective cylinder 2 is constant, wherein in FIG. 5 between the times t2 and t3 the injection nozzle needle 27 of the injection nozzle 23, starting from the state of FIG. 3, is again transferred in the direction of the state of FIG. 2 so that at the time t3 the introduction of ignition fluid into the combustion chamber 9 of the respective cylinder 2 is terminated. Accordingly, when in the second operating mode of the dual-fuel engine exclusively the first injection orifices 25 are utilised for introducing the ignition fluid into the combustion chamber 9 of the respective cylinder 2, the curve profile 32 forms between the times t0 and t3.

In the first operating mode of the dual-fuel engine, the introduction of the injection quantity M into the combustion chamber 9 of the respective cylinder 2 takes place via the curve profile 33, namely in such a manner that the injection nozzle 23, starting from the state of FIG. 2, is transferred via the state of FIG. 3 into the state of FIG. 4, namely in such a manner that between the times t0 and t4 initially exclusively first fuel is introduced via the first injection orifices 25 of the injection nozzle 23 and commencing with the time t4 additionally also via the second injection orifices 26 of the injection nozzle 23 into the combustion chamber 9 of the respective cylinder 2 of the dual-fuel engine. Commencing with the time t6, the closing of the injection nozzle 23 takes place at the end of a respective injection cycle, wherein between the times t6 and t7 the second injection orifices 26 of the injection nozzle 23 and between the times t7 and t8 also the first injection orifices 25 of the injection nozzle 23 are closed or blocked.

In the second operating mode of the dual-fuel engine, the ignition fluid can also be introduced into the combustion chamber 9 of the respective cylinder 2 according to the curve profile 34, wherein in the second operating mode of the dual-fuel engine is then introduced into the combustion chamber 9 of the respective cylinder 2 both via the first injection orifices 25 of the respective injection nozzle 23 and also via the second injection orifices 26 of the respective injection nozzle 23, namely between the times t0 and t4 and between the times t7' and t8' exclusively via the first injection orifices and between the times t4 and t6' both via the first injection orifices 25 and also via the second injection orifices 26.

With the injection nozzle 23 according to an aspect of the invention, a large quantity of first fuel can be introduced into the combustion chamber 9 of the cylinder 2 of the dual-fuel engine 1 with a simple design of the same in the first operating mode of the dual-fuel engine and a small quantity of first fuel, which then serves as ignition fluid, in the second operating mode of the dual-fuel engine. No separate injection system for ignition fluid is required. The injection nozzle 23 according to the invention can be easily manufactured.

Furthermore, the invention relates to a dual-fuel engine 1 preferentially having multiple cylinders 2, wherein each cylinder 2 comprises an injection nozzle 23 according to an aspect of the invention. Further, the disclosure relates to a method for operating a dual-fuel engine 1, with which in the second operating mode of the dual-fuel engine, in which the injection nozzle 23 serves for introducing ignition fluid into the combustion chamber 9 of the respective cylinder, the introduction of ignition fluid takes place according to the curve profile 34 of FIG. 5, after which in the second operating mode the ignition fluid is introduced into the combustion chamber 9 of the respective cylinder 2 both via the first injection orifices 25 with the relatively small injection orifice cross-section and also via the second injection orifices 26 with the relatively large injection orifice cross-section.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An injection nozzle for a cylinder of a dual-fuel engine, wherein via the injection nozzle in a first operating mode of the dual-fuel engine a first fuel can be introduced into a combustion chamber of the cylinder and in a second operating mode of the dual-fuel engine, ignition fluid for a second fuel can be introduced into a combustion chamber of the cylinder, wherein the injection nozzle comprises:
   an injection nozzle body with first injection orifices and second injection orifices; and
   an injection nozzle needle that is displaceably guided in the injection nozzle body and is configured as a unitary body,
   wherein:
      the first injection orifices have a smaller injection orifice cross-section than the second injection orifices;
      the first injection orifices and the second injection orifices seen in an axial direction and have a defined distance in a displacement direction of the injection nozzle needle;
      in a closing or blocking displacement direction of the injection nozzle needle configured to close or block the first injection orifices and the second injection orifices, the first injection orifices are located in front of the second injection orifices; and
      in an opening or unblocking displacement direction of the injection nozzle needle configured to open or unblock the first injection orifices and the second injection orifices, the first injection orifices are located behind the second injection orifices,
      wherein a surface of the injection nozzle body facing the injection nozzle needle is a sawtooth with a peak between the first injection orifices and the second injection orifices.

2. The injection nozzle according to claim 1, wherein the injection nozzle needle comprises:
   a first needle portion, which interacts with a first valve seat of the injection nozzle body; and
   a second needle portion, which interacts with a second valve seat of the injection nozzle body,
   wherein when the injection nozzle needle opens or unblocks the first injection orifices and the second injection orifices, the first needle portion is lifted off the first valve seat and the second needle portion is lifted off the second valve seat.

3. The injection nozzle according to claim 2, wherein when the injection nozzle needle only opens or unblocks the first injection orifices, the first needle portion is lifted off the first valve seat, and the second needle portion lies against the second valve seat.

4. The injection nozzle according to claim 1, wherein the injection nozzle needle in the first operating mode of the dual-fuel engine, in which the injection nozzle is configured to introduce the first fuel into the combustion chamber of the cylinder, opens or unblocks the first injection orifices and the second injection orifices for introducing the first fuel into the combustion chamber of the cylinder.

5. The injection nozzle according to claim 1, wherein the injection nozzle needle in the second operating mode of the dual-fuel engine, in which the injection nozzle is configured to introduce the ignition fluid into the combustion chamber of the cylinder, opens or unblocks the first injection orifices for introducing the ignition fluid into the combustion chamber of the cylinder while the second injection orifices remain closed or blocked.

6. The injection nozzle according to claim 1, wherein the injection nozzle needle in the second operating mode of the dual-fuel engine, in which the injection nozzle is configured to introduce the ignition fluid into the combustion chamber of the cylinder, opens or unblocks the first injection orifices and the second injection orifices for introducing the ignition fluid into the combustion chamber of the cylinder.

7. The injection nozzle according to claim 2, wherein:
the first needle portion of the injection nozzle needle is contoured frustoconically, and
the second needle portion of the injection nozzle needle is contoured cylindrically.

8. The injection nozzle according to claim 1, wherein in the first operating mode of the dual-fuel engine, in which the injection nozzle is configured to introduce the first fuel into the combustion chamber of the cylinder, the first fuel flows exclusively along the injection nozzle needle on an outside through a gap between the injection nozzle needle and the injection nozzle body.

9. The injection nozzle according to claim 1, wherein in the second operating mode of the dual-fuel engine, in which the injection nozzle is configured to introduce the ignition fluid into the combustion chamber of the cylinder, the ignition fluid flows exclusively along the injection nozzle needle on an outside through a gap between the injection nozzle needle and the injection nozzle body.

10. A dual-fuel engine, comprising:
a combustion chamber having at least one cylinder; and
a fuel supply device, which for each respective cylinder comprises:
an injection nozzle body with first injection orifices and second injection orifices; and
an injection nozzle needle that is displaceably guided in the injection nozzle body and is configured as a unitary body,
wherein:
the first injection orifices have a smaller injection orifice cross-section than the second injection orifices;
the first injection orifices and the second injection orifices seen in an axial direction and have a defined distance in a displacement direction of the injection nozzle needle;
in a closing or blocking displacement direction of the injection nozzle needle configured to close or block the first injection orifices and the second injection orifices, the first injection orifices are located in front of the second injection orifices;
in an opening or unblocking displacement direction of the injection nozzle needle configured to open or unblock the first injection orifices and the second injection orifices, the first injection orifices are located behind the second injection orifices,
wherein:
in a first operating mode of the dual-fuel engine, the combustion chamber can be supplied with a first fuel for combustion, and
in a second operating mode of the dual-fuel engine the combustion chamber is supplied with a second fuel for combustion and an ignition fluid, and
wherein a surface of the injection nozzle body facing the injection nozzle needle is a sawtooth with a peak between the first injection orifices and the second injection orifices.

11. The dual-fuel engine according to claim 10, wherein in the second operating mode of the dual-fuel engine, ignition fluid is introduced into the combustion chamber of each respective cylinder via the first injection orifices and the second injection orifices of each respective cylinder.

12. A method for operating the dual-fuel engine according to claim 10, wherein in the second operating mode of the dual-fuel engine, ignition fluid is introduced into the combustion chamber of each respective cylinder via the first injection orifices and the second injection orifices of each respective cylinder.

13. The injection nozzle according to claim 1, wherein a surface of the injection nozzle needle facing the injection nozzle body is a sawtooth with at least one peak configured to contact the peak of the injection nozzle body between the first injection orifices and the second injection orifices.

* * * * *